United States Patent
McCuskey

(10) Patent No.: US 8,770,151 B1
(45) Date of Patent: Jul. 8, 2014

(54) PET TAIL SLEEVE SYSTEM

(76) Inventor: Scott McCuskey, Boardman, OH (US)

(*) Notice: Subject to any disclaimer, the term of this patent is extended or adjusted under 35 U.S.C. 154(b) by 14 days.

(21) Appl. No.: 13/555,423

(22) Filed: Jul. 23, 2012

(51) Int. Cl.
*A01K 13/00* (2006.01)

(52) U.S. Cl.
USPC .................................................. 119/850

(58) Field of Classification Search
USPC ......... 119/850, 725, 809, 811, 814, 815, 816, 119/856
See application file for complete search history.

(56) References Cited

U.S. PATENT DOCUMENTS

| | | | |
|---|---|---|---|
| 148,367 A | 3/1874 | Howard | |
| 1,111,935 A * | 9/1914 | Wright | 119/850 |
| 4,221,189 A * | 9/1980 | Olvera | 128/866 |
| 4,233,942 A * | 11/1980 | Williams | 119/814 |
| 4,378,667 A * | 4/1983 | Velarde, Jr. | 119/850 |
| 4,969,917 A * | 11/1990 | Prue | 119/811 |
| 5,408,812 A * | 4/1995 | Stark | 54/82 |
| 6,532,904 B1 * | 3/2003 | Bowen | 119/865 |
| 7,537,173 B1 | 5/2009 | Kogan | |
| 8,448,610 B1 * | 5/2013 | Zeitler | 119/850 |
| 2007/0074677 A1 * | 4/2007 | Behme | 119/850 |

FOREIGN PATENT DOCUMENTS

| | | | | |
|---|---|---|---|---|
| GB | 2265812 A | * 10/1993 | | A01K 13/00 |
| GB | 2359239 | 8/2001 | | |

* cited by examiner

*Primary Examiner* — Kimberly Berona
*Assistant Examiner* — Jessica Wong
(74) *Attorney, Agent, or Firm* — Harpman & Harpman

(57) ABSTRACT

A lightweight sanitary disposable tail cover for pets and animals that provide protection to the injured portion of the tail. The tail cover has elongated optional split access sleeves and resilient cushion enclosure chamber which can be adjustably positioned on the pet's tail according to length and orientation of the injury thereon.

3 Claims, 3 Drawing Sheets

PET TAIL SLEEVE SYSTEM

BACKGROUND OF THE INVENTION

1. Technical Field

This invention relates to pet treatment devices for medical problems which require some form of appliance to be used to cover the injured area and prevent the pet from contact or repetitive injury to assure proper healing.

2. Description of Prior Art

Prior art devices of this type have been directed to a variety of dressings and covers for pets, such as dogs and cats. The primary known examples are bandage wraps and neck collar cones that keep the pet from chewing the injured area and removing the dressing or wrap.

Devices for tail injuries are generally fabricated by the veterinarian or health care worker on the spot simply using a variety of medical grade bandage wraps and tapes. Custom leg splints and casts are also known and available depending on the associated pet injury. A number of orthotic braces have been developed for pets, but there are no known specialty tail protection devices directed towards specific tail injuries on pets such as broken or sprained tails. See for example, U.S. Pat. No. 7,537,173, 148,367, and GB 2,359,239.

U.S. Pat. No. 148,367 is directed to a device to protect horses' tails having a bag with a flap and a retaining strap.

U.S. Pat. No. 7,537,173 discloses a drinking straw for heated liquids to be cooled. Thereby openings are provided therein so air can be drawn in as liquid is sucked up by the user therethrough for cooling the liquid with multiple chambers inducing air bubbles into the liquid straw forming foam.

GB Patent 2,359,239 is a protective sleeve for a dog's tail.

SUMMARY OF THE INVENTION

An integral adjustable tail protection and isolation device for use on injured pet tails. An elongated lightweight yieldable synthetic resin plastic sleeve with an air cushion portion for isolation of the injury site on the tail. The sleeve is split longitudinally for ease of tail placement and insertion with length determinant elements allowing for cutting to accommodate different pet tail lengths and the longitudinally oriented positioning of an enlarged cushion area over the injury on the tail.

DETAILED DESCRIPTION OF THE INVENTION

Figure 1:
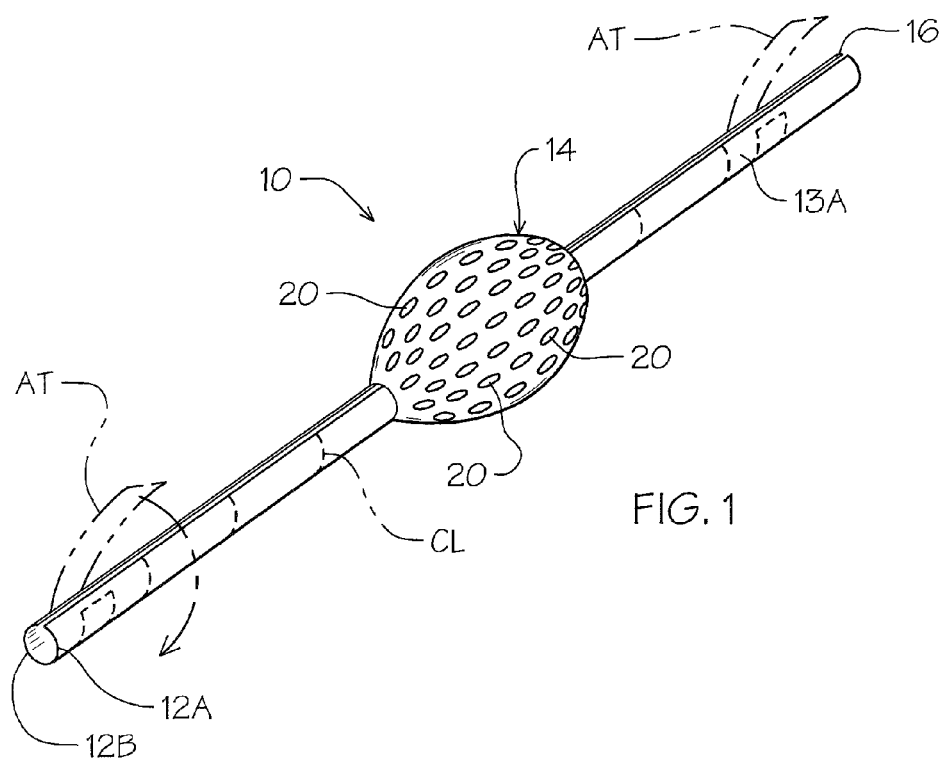
FIG. 1 is a perspective view of the pet tail appliance of the invention.
Figure 2:
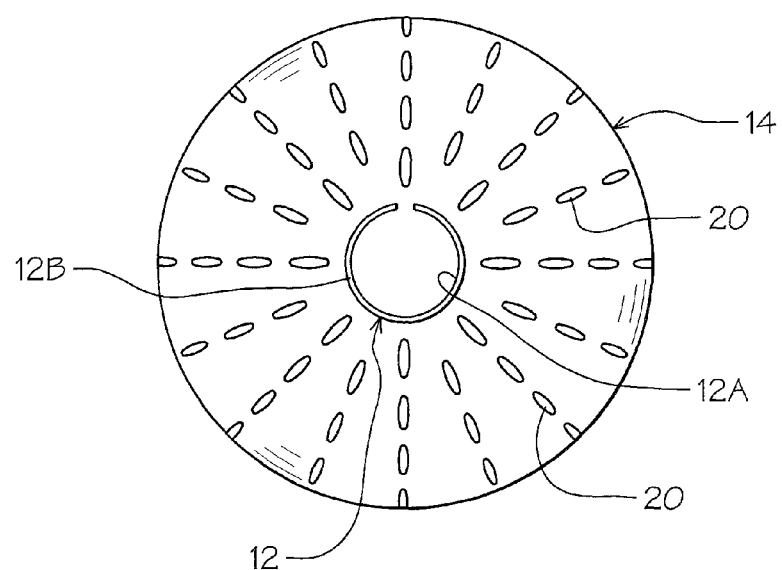
FIG. 2 is an enlarged end plan view thereof.

Referring now to FIG. 1 of the drawings, a pet tail application device 10 of the invention can be seen having an integral one-piece body member 11 with an elongated cylindrical anterior sleeve portion 12 and a posterior sleeve portion 13. The respective sleeve portions 12 and 13 are joined by an injury receiving area 14 therebetween which is of an increased annular diameter defining a protection chamber 15 therewithin.

Figure 5:
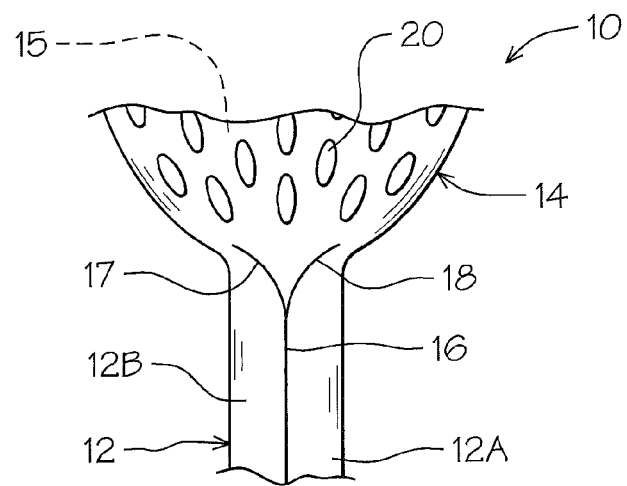
FIG. 5 is an enlarged top plan view of the transition portion of the device between the split sleeve and enlarged cushion chamber illustrating access split sleeve slit orientation thereon.
Figure 6:
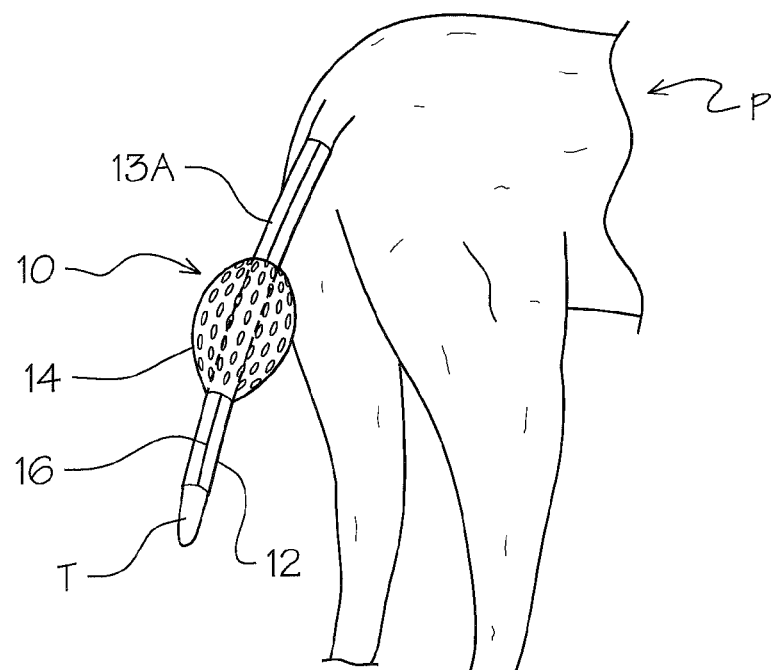
FIG. 6 is a partial perspective view illustration of the invention positioned on a pet's tail in use.

Each sleeve portion 12 and 13 is slit longitudinally along its overall length at 16 terminating at the corresponding transition to the enlarged injury receiving area 14 as best seen in FIG. 5 of the drawings with translateral divergency slit continuation at 17 and 18. This slit divergency will allow the slit 16 to define sleeve element portions 12A and 12B, 13A and 13B to be opened along their longitudinal access for placement about a pet's P tail T as seen in FIG. 6 of the drawings. The respective sleeve portions 12 and 13 and the injury receiving area 14 of increased transverse annular dimension are formed, in this example, from a lightweight synthetic resin material of a flexible yieldable nature having a material memory that will allow for return after deflection to the original cylindrical shape of the respective sleeve portions 12 and 13.

As noted, given the nature of the material used, the sleeve portions 11 and 12 can be selectively cut transversely to incremental lengths to allow for proper positioning of the protection chamber 15 of the injury receiving area 14 of increased annular dimension over an injured site as illustrated in FIG. 6 of the drawings on the pet P.

Such selective length adjustment maybe noted generally by guide cut lines CL as seen in FIG. 1 of the drawings, but can occur incrementally at any portion along the respective longitudinal length of the sleeve portions 12 and 13 as required.

The protection chamber 15 as defined hereinbefore has a plurality of vent apertures at 20 therein as well as may be made of a non-vented semi-transparent material to afford visual monitoring of the injured area of the tail positioned therewithin.

Figure 3:
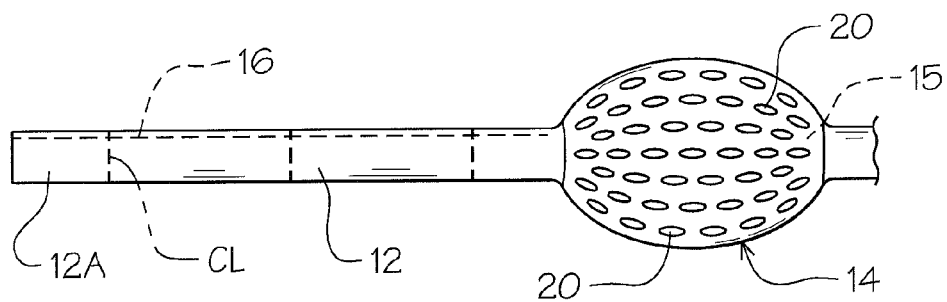
FIG. 3 is a side elevational view showing a user modified length application.
Figure 4:
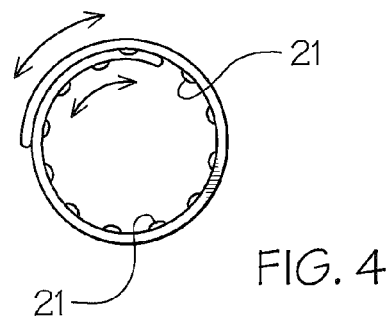
FIG. 4 is an end view of an alternate form of the invention illustrating resilient annular adjustment for size tail differentials.

Referring now to FIGS. 3 and 4 of the drawings, alternate length and diameter adjustment configurations can be seen respectively wherein just the anterior sleeve portion 12 and protection chamber 15 is illustrated in FIG. 3 of the drawings for those applications in which the tail injury is at the end of the pet's tail, for example.

In FIG. 4 of the drawings, an enlarged end plan view illustrates an alternate form of the invention wherein overlapping sleeve elements 12A' and 12B' wherein after principle molding and slitting are drawn together in a resilient fashion allowing for annular dimensional adjustment and retention dependent on the cross-sectional dimension of the pet's tail to which it is applied.

Alternately, the respective sleeve portions 12 and 13 may be used independently of the protection chamber 15 wherein selective lengths of adjustably supportive sleeve material may be needed on the pet's tail T in accordance with other veterinarian procedures and requirements which may occur and are well known to those skilled in the art such as a simple tail splint.

It will be noted that a variety of selective manufacturing materials may be used depending on the application parameters defined by potential user criteria in which, as noted, some materials having a return memory provide for adjustable annular closure about the diameter of the tail T which along with the auxiliary retainment tape AT illustrated in broken lines generally in FIG. 1 of the drawings as an example of potential placement positioning provide additional retainment assistance on the pet's tail T.

Additionally, the interior surface of the respective sleeves 12 and 13 may have a surface enhancement texture at 21 that will aid in the retention indicated in an alternate form shown for illustrative purposes, but not limited to the structure illustrated in FIG. 4 of the drawings.

Figure 7:
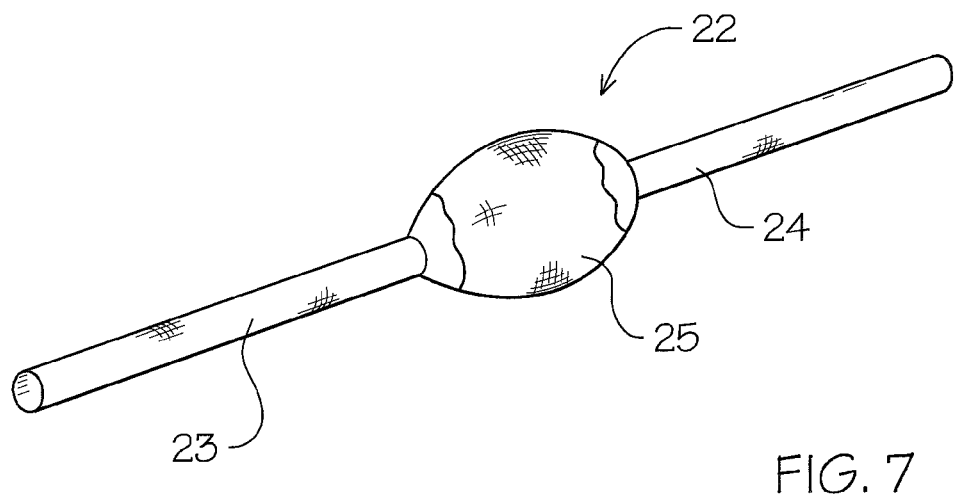
FIG. 7 is a perspective view of an alternate form of the invention utilizing elastic material and integrated cushion enlarged insert for flexible yieldable placement on the pet's tail.

It will be evident to those skilled in the art that other types of alternate material may be used beyond that of the preferred synthetic resin material as such referring to FIG. 7 of the drawings an elastic fabric weave 22 to emulate the respective alternate anterior and posterior sleeve portions at 23 and 24 with a fabric covered and support synthetic foam cushion area of increased dimension at 25 for yieldable injury protection as noted hereinbefore described primary form of the invention.

It will thus be seen that a new and novel pet tail injury protection system has been illustrated and described and it will be apparent to those skilled in the art that various changes and modifications may be made therein without departing from the spirit of the invention. Therefore I claim:

The invention claimed is:

1. A cover for use on the injured tail of a small animal comprising, an elongated open ended cylindrical sleeve for covering a portion of the tail, said sleeve having an anterior portion and a posterior portion of equal uniform diameter, said anterior and posterior portions are split longitudinally inwardly from their respective free ends terminating at a distinctive area of reduced longitudinal length and increased annular dimension positioned between said anterior and posterior portions enclosing the injury on the tail, defining a hollow chamber having a plurality of vent apertures uniformly thereabout, wherein said split in said anterior and posterior portions further comprises a bifurcated slit continuation continuing into said hollow chamber.

2. The cover for use on the injured tail of a small animal set forth in claim 1 wherein said split cylindrical sleeve's anterior and posterior portions have a plurality of annular transverse cutting guide lines in spaced longitudinal relation to one another there along.

3. The cover for use on the injured tail of a small animal set forth in claim 1 wherein said elongated sleeve and said area of increased annular dimension is are of a resilient synthetic resin material.

* * * * *